April 8, 1947.   T. ZUSCHLAG   2,418,686
TESTING OF MAGNETIC MATERIALS
Filed Jan. 13, 1944
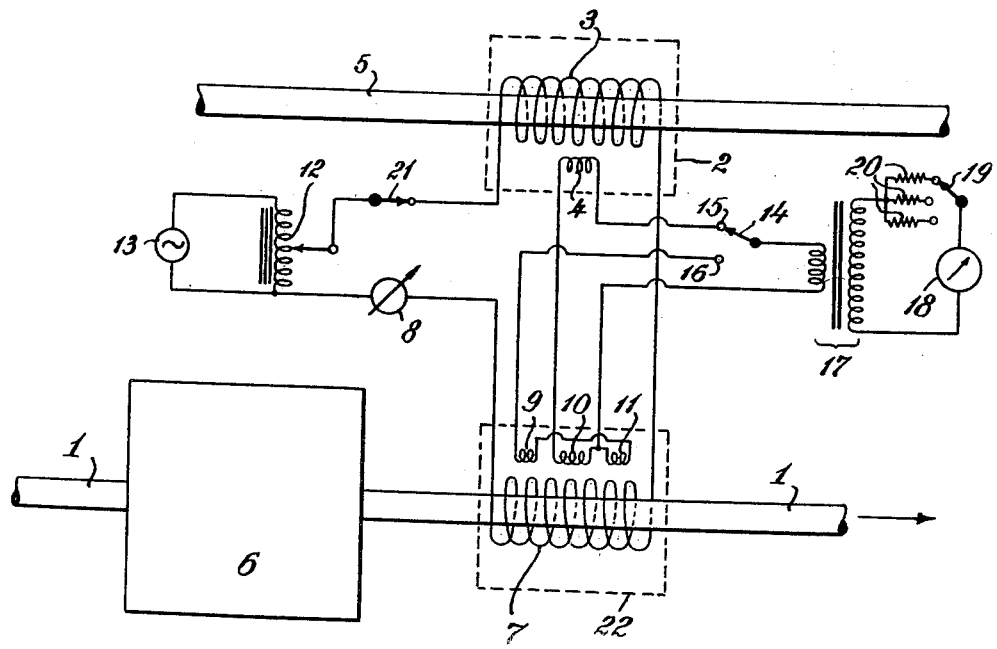
INVENTOR
*THEODORE ZUSCHLAG*
BY
*Pennie, Davis, Marvin and Edmonds.*
ATTORNEYS Patented Apr. 8, 1947

2,418,686

UNITED STATES PATENT OFFICE 2,418,686

TESTING OF MAGNETIC MATERIALS

Theodore Zuschlag, West Englewood, N. J., assignor to Magnetic Analysis Corporation, Long Island City, N. Y., a corporation of New York Application January 13, 1944, Serial No. 518,094

9 Claims. (Cl. 29—148)

1

The present invention relates to the testing of magnetic materials, especially to detect undesired variations therein, during manufacture or working thereof, and also to testing and preconditioning of such material for satisfactory magnetic analysis procedure for detecting flaws and other imperfections.

In the manufacture and working of magnetic material in forms for which there is a large commercial demand, such for example as bar stock, wire, rails and tubes, the material is usually drawn or rolled at a high rate of output. Under such conditions it has heretofore been difficult, if not impossible, to maintain a given product uniform except at greatly increased cost, and it has also been impossible, satisfactorily to test all of such material for flaws and other imperfections during the manufacture thereof.

By means of the present invention it is now possible to test at very low cost the entire output of a mill to ascertain and maintain uniformity of the product, and also to determine whether the product is in proper condition for magnetic analysis, and accordingly to make the adjustments necessary to achieve uniformity or to effect the working of the product necessary to precondition it for satisfactory magnetic analysis. In the testing of magnetizable materials by magnetic analysis for flaws or defects, two difficulties have been encountered: (1) artificial or spurious indications of physical defects or flaws in a specimen which is actually free from such defects and flaws, and (2) a varying or non-uniform "magnetic background" which prohibits use of a sufficiently sensitive adjustment of the magnetic analysis apparatus to permit detection of extremely small defects and flaws.

It is a known fact that the working of ferrous material resulting in plastic deformation thereof is accompanied by a change in magnetic characteristics as evidenced by the measured permeability of the material. I have discovered that the detection of flaws and defects in magnetic materials by induction methods, as in magnetic analysis, can be satisfactorily and reliably achieved only if the "magnetic background" i. e. its ability to be magnetized, is reasonably uniform and exceeds a certain predetermined minimum or low response level. Such selected minimum or low response level of magnetic background can be introduced by effecting the required plastic deformation.

In accordance with the present invention the magnetic background is determined or measured by comparison of permeability measurements of an unknown specimen of the product with those of a standard or known sample of the same product. Apparatus suitable for making such measurements is described hereinafter. This apparatus is not of a type suited to the detection of fine flaws and defects by so-called magnetic analysis. Apparatus, systems and methods suitable for magnetic analysis are described in my U. S. Letters Patent No. 2,102,452, granted December 14, 1937, and No. 2,140,662, granted December 20, 1938.

Apparatus applicable to the present invention is illustrated in the drawing. The magnetic material 1, to be measured and ultimately to be tested by magnetic analysis for flaws and other defects, may for purposes of illustration be assumed to be steel bar stock. This material may be assumed to be moving from left to right, as seen in the drawing, through a machine 6 which is generally represented because it may be any suitable type of machine or step in the manufacture or mill procedure by which the material is treated or worked. For example, this machine or apparatus may be for drawing, rolling, straightening, heating, quenching, cooling, annealing or any other operation or combination of operations performed in connection with the manufacture and working of magnetic materials of the types herein contemplated. In the present specification and appended claims it is intended that the term "plastic deformation" shall be interpreted as embracing all of the foregoing, and equivalent, operations.

After leaving the machine 6 the material passes through an energizing coil 7 and also through pickup coils 9, 10 and 11 later to be described. All these coils should be arranged symmetrically with respect to material 1. Energizing coil 7 is connected in series with an exactly similar energizing coil 3, both coils being connected to a suitable source 13 of alternating current, such as 60 cycles, 120 volts. A potentiometer 12 of the reactance type is provided in this energizing circuit to control the energizing current in the coils 3 and 7, and a switch 21 is provided for opening and closing the energizing circuit. A suitable ammeter 8 is included in this circuit to indicate the current therein as controlled by potentiometer 12. Pickup coil 10 is inductively related to material 1, and another pickup coil 4 is arranged in inductive relation to material 5 which is a previously measured and therefore standardized sample of the material being measured.

Pickup coils 4 and 10 should be identical and arranged similarly in each coil structure enclosed in shielded containers 2 and 22, respectively.

These two coils are connected in series opposing relation with each other and in series with the primary of a coupling transformer 17. Switch 14 in this pickup coil circuit, when in connection with contact 15 connects pickup coils 4 and 10 alone in the pickup circuit. When switch 14 is connected to contact 16 these balanced pickup coils are disconnected and in their stead pickup coils 9 and 11 are connected in the pickup circuit. These two coils 9 and 11 are similarly and symmetrically disposed with respect to the material 1 under measurement, and are connected in series opposition with respect to each other. Coils 9 and 11 are employed when it is desired to measure successive portions of the same piece of material, viz., by comparing one portion against another, as the specimen passes by the coils, as distinguished from coils 10 and 4 which measure portions of the unknown specimen against a standard specimen of the material.

The output, or measuring and indicating, circuit comprises the secondary of transformer 17 connected in series with a suitable measuring or indicating instrument 18, such as a galvanometer calibrated in volts, and a plurality of resistors 20 of different values selectable by a switch 19. Selection of these resistors permits variation of the sensitivity of the indicating or measuring circuit.

The measuring system above described has proved of great utility in a steel mill, for example, for the following reasons: Substantially all types of working and heat treatment of steel results in some plastic deformation of the material. Such deformation is permanent and usually results in a change in permeability which decreases with increased degree of cold working. In a specimen of bar stock (bar stock being referred to merely by way of illustration), the permeability as measured by the system above described will be substantially uniform, providing the working of the material which preceded the measurement was uiform. For example, if the rolling, drawing or straightening operation which may have been effected by machine 6 was uniform, the reading on meter 18 will be substantially uniform as the material passes through coil assembly 22. However, if the machine 6 includes straightening rolls, for example, and these rolls are incorrectly adjusted, the plastic deformation of the material will be non-uniform, the result of which will be a constant fluctuation of meter 18. Such fluctuations will be evident whenever a length of material (which may be from 6 inches to 2 feet) passes through the coil assembly 22. For many commercial purposes, bar stock which has been unevenly straightened is undesirable, and for some purposes completely unsatisfactory, but ordinary inspection methods fail completely to detect this type of defect. However, in accordance with the present invention the mill operator need merely observe the fluctuations on the meter 18 and again correct them by readjustment of the straightening rolls, in the example referred to, until the meter ceases to fluctuate. A corresponding procedure may be followed to assure uniformity of product when any other working is performed by machine or apparatus 6. For such tests switch 14 may be thrown to contact 16.

The apparatus and method of the present invention are in many cases of even greater commercial utility and value in connection with the measurement and preconditioning of magnetic materials prior to magnetic analysis for the detection of flaws and defects. This feature of the invention will now be described.

It has heretofore been observed and confirmed by investigations in the art that one of the great obstacles to completely successful magnetic analysis has been the lack of proportionality between spurious indications caused by insignificant magnetic variations in a specimen and indications of magnetic variations due to actual mechanical flaws or defects which it is desired to detect. I have found that this lack of proportionality is greatly diminished after the material has been worked sufficiently to bring the "magnetic background" up to a minimum or selected low response level. As above explained this minimum level of magnetic response is directly related to the degree of plastic deformation which results from the working. Consequently, in accordance with the present invention if, for a given heat or run of a given material, the minimum or selected low level of magnetic response is ascertained, that entire heat or run of material can be tested for flaws and defects by means of sensitive magnetic analysis equipment with the assurance that indications of defects will be substantially genuine and not spurious, provided the material be first brought to the required minimum or selected low response level.

Magnetic analysis procedures, and especially those in which a low-frequency energizing current is employed and in which the specimen is not highly magnetized by a direct current field during the test, are actually based upon measurements of magnetic permeability of the material. A perfect specimen will indicate uniform permeability, and the permeability level as indicated by suitable measuring apparatus will be constant. However, when a flaw or other defect passes within the field of the pickup coil or coils there will be a change in reading of the indicating instrument because the permeability is different (usually less, by absolute measurement) at the location of the flaw or defect. From this it is evident that the indication of flaws or defects by permeability methods is in fact an indication of the relation between the levels of the normal magnetic permeability background and the magnetic permeability level at the location of the flaw or defect. It follows that unless the permeability contrast is sufficient, the magnetic analysis will not indicate small flaws and defects. Thus, in accordance with the present invention the level of the magnetic permeability background is determined or measured and, if it is incorrect it is corrected by appropriate preconditioning of the material so as to assure that the magnetic contrast shall be great enough to permit satisfactory magnetic analysis of the material in question.

In steel mills, steel bar stock, for example, is commonly hot rolled and then cold drawn. Cold drawing usually introduces sufficient plastic deformation to provide a norm of permeability which will provide a good contrast against the different permeability at the location of a flaw or defect, when the material is tested by magnetic analysis. In accordance with the invention the method of procedure to ascertain the "selected low response level" or norm permeability may be as follows: First, a hot rolled specimen of the bar stock, later to be tested in quantity, is carefully inspected and analyzed by laboratory methods, if required, to ascertain that the specimen is perfect. This specimen can then be used as the standard 5 in the measuring system as above described.

In accordance with the assumed example the second step is as follows: With standard specimen 5 placed in inductive relation to coil 3, as shown in the drawing, and no specimen in coil 7, a reading is taken on meter 18. This reading might be 8.0 volts, absolute, for example, and would depend upon the setting of selector switch 19 and potentiometer 12, as well as upon the permeability of the standard specimen 5. The purpose of this step is to obtain a reading against which to check later production of hot rolled stock. Obviously, it may be omitted if desired.

It should be recalled that the standard specimen 5 has been merely hot rolled and that the permeability is higher than it should be for satisfactory results in connection with magnetic analysis for flaws and defects. Consequently in the measurement next to be described, it is to be understood that there should be a difference in the indicated permeability between that of standard specimen 5 and that of the unknown specimen 1. The higher the reading of meter 18 in this comparative measurement the greater is the indicated difference between the two specimens. This reading is entirely comparative and is not a measure of the absolute permeability. Third, the material is cold drawn, for example, and the norm or minimum response level of magnetic background is ascertained by selecting a specimen bar of the cold drawn material which is known to be defective and testing it with magnetic analysis equipment of the type described in the patents above referred to. If the defects show up well in the magnetic analysis (viz., are readily indicated with sufficiently sensitive adjustments of the apparatus) it may be assumed that the norm or selected low response level of magnetic background of this specimen is at least sufficiently high. The specimen may then be stress-relieved or heated in small stages, being measured after each stage until the background drops below the level giving sufficient contrast. If these successive readings are recorded or plotted the actual level of "minimum response" can be closely determined. However, in most commercial work it is not necessary that the "minimum" level relied on be the lowest possible low response level, but merely a level resulting from minimum practicable working which provides sufficient magnetic contrast. If, on the other hand, the first such magnetic analysis measurement indicates the magnetic background to be below the necessary response level, the sample or specimen in question should be again cold drawn, straightened or otherwise preconditioned by working to raise the level, and the magnetic analysis procedure repeated. This second preconditioning will usually suffice but should, of course, be repeated if the magnetic analysis measurements indicate that the response level is still not great enough. Fourth, with this specimen known to have a satisfactory magnetic background for magnetic analysis procedure, the specimen is inserted in coil 7 and measured against the standard 5, whereupon the reading of meter 18 will represent the minimum response level or norm of magnetic background for the particular material in the form under test. It might be, for example, 0.2 volt. In ascertaining this level by indication of meter 18, ammeter 8 should also be read so that the current in the energizing coils 7 and 3 may be duplicated during the run-of-the-mill testing which is to follow.

Fifth, the defective specimen should be removed from coil 7 and the equipment arranged so that the run-of-the-mill bar stock coming from machine 6 (which in this instance is assumed to be a drawbench) passes through coil 7, during which the reading on meter 18 is observed and might be again 0.2 volt. Under the assumed conditions, if the product from this bench continues to produce a minimum reading of 0.2 volt on the meter 18 and if this reading is substantially constant the operator will know (1) that the material is coming through in accordance with the required specifications; and (2) that the magnetic background is such as to permit satisfactory magnetic analysis. In normal mill procedure such magnetic analysis tests may conveniently follow the measurement just described.

In the event that meter 18 reads lower than 0.2, in the instance assumed, the operator will know that the material then measured cannot be suitably tested by magnetic analysis procedure for flaws and defects and will segregate such material to be further preconditioned and again measured for response level.

Actual magnetic background measurements made on steel bar stock with apparatus as above described were in one instance, as follows: The reading for the hot-rolled bar was 0.0 volt, and the minimum response level for this particular material was 0.06 volt. After cold drawing the reading was 0.2 volt. A piece of this stock after hot rolling was annealed and the reading dropped to −0.12 volt. The remainder of the sample after cold drawing was straightened and the reading increased from 0.2 to 0.22 volt. Thereafter the specimen was heat treated to relieve the internal stress in accordance with known mill procedure and the reading dropped to 0.11 volt. Thereafter the specimen was again run through the straightening rollers and the reading increased to 0.17 volt.

From the foregoing it will be observed that except for the isolated step of annealing, the specimen remained at all times above the minimum response level from the time it was cold drawn. However, it might be that if the step of cold drawing did not produce a sufficient decrease in diameter the plastic deformation might not have been such as to raise the level above the required minimum, or the cold drawing operation might have raised it so little above the minimum response level that the step of relieving the stress would have dropped it below the required minimum level. From this it will be evident that in connection with any given heat of steel, for example, it is advisable first to ascertain the response level resulting from each of the various steps of the necessary mill operations, and thereafter to subject the run of the material to magnetic analysis only after an operation which is known to leave the material in a condition at which the specimen is above the minimum response level.

If the level measurements above described indicate slow fluctuations of not very great amplitude as the bar stock, for example, is moving through the test coil 7, the reason is probably that the bar has been magnetized to some extent. However, such slow fluctuations are readily distinguished from those of the type heretofore mentioned and can usually be ignored. If they be severe, the material may be demagnetized in the manner described in my application for U. S. Letters Patent No. 366,873, filed November 23, 1940, now Patent No. 2,355,940.

What is claimed is:

1. In a method of preconditioning magnetic material for magnetic analysis, the steps which comprise selecting a test specimen from the material to be preconditioned which has detectable flaws or defects, establishing in said test specimen a magnetic permeability background of a selected low response level, measuring the magnetic permeability background of the remainder of said material to ascertain whether the response levels thereof at least equal said selected low level, and separating those portions of said remainder which have a magnetic permeability background less than said selected low response level from those portions thereof which have a magnetic permeability background at least equal to said selected low response level.

2. In a method of preconditioning magnetic material for magnetic analysis, the steps which comprise selecting a test specimen from the material to be preconditioned which has detectable flaws or defects, establishing in said test specimen a magnetic permeability background of a selected low response level, measuring the magnetic permeability background of the remainder of said material to ascertain whether the response levels thereof at least equal said selected low level, and subjecting such portions of said remainder as do not equal said selected low level to plastic deformation to raise the magnetic response levels thereof so that any flaws or defects therein are more readily detectable on subsequent magnetic analysis of the material.

3. In a method of preconditioning magnetic material for magnetic analysis, the steps which comprise establishing a magnetic permeability background of a selected low response level at which flaws and defects in said material are readily detectable by magnetic analysis, measuring the magnetic permeability background of the material against said established selected low response level as a standard to ascertain whether the response levels thereof at least equal said selected low response level, and subjecting such portions of the material as do not have a magnetic permeability background at least as high as said selected low response level to plastic deformation to raise the magnetic response levels thereof to at least equal said established low response level so that any flaws or defects therein are more readily detectable upon subsequent magnetic analysis.

4. In a method of preconditioning magnetic material for magnetic analysis, the steps which comprise selecting a test specimen from the material to be preconditioned which has a magnetic response level below that at which flaws or defects readily are detectable by magnetic analysis, mechanically working said test specimen until it has a selected low response level at which flaws or defects readily are detectable by magnetic analysis, mechanically working the remainder of said material, measuring the magnetic permeability background of the remainder of said material which was mechanically worked against the magnetic permeability background of said test specimen as a standard to ascertain whether the response levels thereof at least equal said selected low level, and subjecting such portions of said remainder as do not equal said selected low level to further mechanical working to raise the magnetic response levels thereof so that any flaws or defects therein are more readily detectable on subsequent magnetic analysis.

5. In a method of preconditioning magnetic material for magnetic analysis, the steps which comprise selecting a test specimen from the material to be preconditioned which has a magnetic response level below that at which flaws or defects readily are detectable by magnetic analysis, cold working said test specimen until it has a selected low response level at which flaws or defects readily are detectable by magnetic analysis, cold working the remainder of said material, measuring the magnetic permeability background of the remainder of said material which was cold worked against the magnetic permeability background of said test specimen as a standard to ascertain whether the response levels thereof at least equal said selected low level, and subjecting such portions of said remainder as do not equal said selected low level to further cold working to raise the magnetic response levels thereof so that any flaws or defects therein are more readily detectable on subsequent magnetic analysis.

6. In a method of preconditioning magnetic material for magnetic analysis, the steps which comprise selecting a specimen of the material which is without significant flaws or defects, subjecting the remainder of the material to plastic deformation, whereby the magnetic permeability thereof is modified, selecting a specimen of said remainder of the material which was subjected to plastic deformation and which has flaws or defects, establishing in said second specimen a magnetic permeability background of a selected low response level, electrically comparing the second specimen having the magnetic permeability background of the selected low response level with said first specimen to obtain an indicated norm of magnetic permeability background, measuring the magnetic permeability background of the remainder of the material which was subjected to plastic deformation to ascertain if it at least equals said indicated norm, and separating those portions of said remainder which have a magnetic permeability background less than said indicated norm from those portions thereof which have a magnetic permeability background at least equal to said indicated norm.

7. In a method of preconditioning hot-rolled magnetic material for magnetic analysis, the steps which comprise selecting a specimen of the hot-rolled material which is without significant flaws or defects, cold drawing the remainder of the material, whereby the magnetic permeability background thereof is modified, selecting a specimen of said remainder of the material which was cold drawn and which has flaws or defects, establishing in said second specimen a magnetic permeability background of a selected low response level, electrically comparing the second specimen having the magnetic permeability background of the selected low response level with said first specimen to obtain an indicated norm of magnetic permeability background, measuring the magnetic permeability background of the remainder of the material which was subjected to cold drawing to ascertain if it at least equals said indicated norm, and subjecting such portions of said remainder of the material as do not have a magnetic permeability background at least equaling said indicated norm to plastic deformation until the magnetic permeability background thereof at least equals said indicated norm so that any flaws or defects therein are more readily detectable on subsequent magnetic analysis thereof.

8. In the magnetic analysis of magnetic material for flaws or defects, the steps which comprise selecting a test specimen of the material which has detectable flaws or defects, establishing in said test specimen a magnetic permeability background of a selected low response level, measuring the magnetic permeability background of the remainder of said material to ascertain whether the response levels thereof at least equal said selected low level, and separating those portions of said remainder which have a magnetic permeability background less than said selected low level from those portions thereof which have a magnetic permeability background at least equal to said selected low level, and thereafter subjecting those portions of said remainder of the material which have a magnetic permeability background at least equal to said selected low level to magnetic analysis to determine whether or not it has flaws or defects therein.

9. In the magnetic analysis of magnetic material for flaws or defects, the steps which comprise establishing a magnetic permeability background of a selected low response level, measuring the magnetic permeability background of the material against said established selected low response level as a standard to ascertain whether the response levels thereof at least equal said selected low level, subjecting those portions of the material which have a permeability background lower than said selected low response level to mechanical working to raise the magnetic response levels thereof to at least equal said selected low response level, and thereafter subjecting the material to magnetic analysis to determine whether or not it contains flaws or defects.

THEODORE ZUSCHLAG.

REFERENCES CITED

The following references are of record in the file of this patent:

UNITED STATES PATENTS

| Number | Name | Date |
| --- | --- | --- |
| 1,103,358 | Hess | July 14, 1914 |
| 1,887,380 | Polydaroff | Nov. 8, 1932 |
| 2,034,501 | Zuschlag | Mar. 17, 1936 |
| 2,102,450 | Zuschlag | Dec. 14, 1937 |
| 1,686,815 | Imes | Oct. 9, 1928 |
| 1,897,634 | De Forest | Feb. 14, 1933 |
| 2,011,441 | Drake | Aug. 13, 1935 |
| 2,143,672 | Archibald | Jan. 10, 1939 |
| 2,059,976 | Stargardter | Nov. 3, 1936 |
| 2,265,137 | Barnes et al. | Dec. 9, 1941 |
| Re. 21,927 | Brace et al. | Oct. 21, 1941 |
| 1,732,615 | Pungel | Oct. 22, 1939 |

OTHER REFERENCES

"Metals Handbook" American Society for Metals, 1939 Edition, p. 772.